US006821222B2

(12) United States Patent
Arbuckle et al.

(10) Patent No.: US 6,821,222 B2
(45) Date of Patent: Nov. 23, 2004

(54) BELT TENSIONING SYSTEM AND METHOD

(75) Inventors: James F. Arbuckle, Fresno, CA (US); Deborah L'Heureux, Fresno, CA (US)

(73) Assignee: Pelco, Clovis, CA (US)

( * ) Notice: Subject to any disclaimer, the term of this patent is extended or adjusted under 35 U.S.C. 154(b) by 111 days.

(21) Appl. No.: 10/254,255

(22) Filed: Sep. 25, 2002

(65) Prior Publication Data

US 2003/0104887 A1 Jun. 5, 2003

Related U.S. Application Data

(60) Provisional application No. 60/334,800, filed on Nov. 30, 2001.

(51) Int. Cl.⁷ .................................................. F16H 7/14
(52) U.S. Cl. ........................ 474/112; 474/114; 474/133
(58) Field of Search ............................... 474/101, 112, 474/114, 115, 133

(56) References Cited

U.S. PATENT DOCUMENTS

| | | | | | |
|---|---|---|---|---|---|
| 2,640,367 A | * | 6/1953 | Rieser | ........................ | 474/114 |
| 2,691,553 A | * | 10/1954 | Pettigrew | .................... | 474/112 |
| 4,979,927 A | * | 12/1990 | Tabori et al. | ............... | 474/114 |

* cited by examiner

Primary Examiner—Thomas R. Hannon
(74) Attorney, Agent, or Firm—Gunster, Yoakley & Stewart, P.A.

(57) ABSTRACT

A system and method for tensioning a belt drive in a remotely controlled video camera is provided in which the belt drive tensioning system has an accessory pulley. A receptacle has a substantially circular opening and an extension. The extension is disposed partially around a periphery of an end of the circular opening and projects partially over the opening. A drive pulley is substantially coplanar with the accessory pulley. A housing has a body wall, a first longitudinal axis and a substantially circular tab provided at an end region of the body wall. The substantially circular tab has a second longitudinal axis which is parallel and eccentric to the first longitudinal axis. A drive pulley is substantially coaxially aligned along the first longitudinal axis and is rotatably coupled to the housing. The housing is configured to engage the receptacle in a first position where the drive pulley is at a first distance from the accessory pulley. The housing is rotatably transitionable between the first position and a second position within the receptacle so that the substantially circular tab is engaged by the extension when the housing is transitioned to the second position where the drive pulley is at a second distance from the accessory pulley. The second distance being greater than the first distance.

21 Claims, 3 Drawing Sheets

BELT TENSIONING SYSTEM AND METHOD

CROSS-REFERENCE TO RELATED APPLICATION

This application is related to and claims priority to U.S. Provisional Patent Application Ser. No. 60/334,800, filed Nov. 30, 2001, entitled REMOTE CONTROLLED CAMERA SYSTEM, the entirety of which is incorporated herein by reference.

STATEMENT REGARDING FEDERALLY SPONSORED RESEARCH OR DEVELOPMENT n/a

FIELD OF THE INVENTION

The present invention relates to belt tensioning, and in particular to a system and method for providing tension to a drive belt in a remotely controlled video surveillance camera.

BACKGROUND OF THE INVENTION

Maintaining proper tension on drive belts has long been the boon of manufacturers in the security camera industry. Drive belts are used in remotely controlled security cameras to move surveillance cameras in a vertical (tilt) axis and a horizontal (pan) axis to position the cameras as desired by an operator. In order to efficiently transfer drive energy from a drive pulley to an accessory pulley which moves a camera via a drive belt and to be able to accurately position the camera, it is necessary to maintain proper tension of the drive belt therebetween. Prior art systems use complex arrangements of parts to accomplish proper belt tension. Many such systems have numerous components and involve multiple steps by an assembler to adjust properly. For example, some prior art systems use an idler pulley to apply pressure to an exposed portion of the drive belt. By this method, tension on the drive belt is accomplished by pressing against the drive belt to create tension on the idler, drive and driven pulleys. An obvious disadvantage of such a system is the necessity to use an additional friction-bearing pulley within the system. As many drive belt systems have the goal of being operated at maximum duty cycles, it is well known that additional moving parts create additional problems related to wear and tear. Further, the cost of construction of such a device is increased by the number of steps necessary to accomplish the goal of having a properly tensioned drive belt Alternate methods of maintaining tension on a drive belt include spring loading either the drive pulley or the accessory pulley to apply tension to the belt. Again, problems with this system include the addition of a spring unit which can be susceptible to wear and breakage. Problems attendant to spring-loaded belt tensioning systems include the tendency of the drive pulley to backlash or slip towards the accessory pulley thereby causing inefficient transfer of rotational energy and/or excessive wear and tear.

Still another system of tensioning a belt drive system includes installing either the drive pulley or the accessory pulley on a slotted track whereby either pulley can be moved away from the other to create tension on the drive belt and then set the pulley in place with an attachment means. This method also has attendant disadvantages related to loosening, wear and tear and improper and/or variable tensioning of the belt from unit to unit.

Accordingly, it is desirable to provide a belt drive tensioning system for remotely controlled security cameras to overcome the attendant disadvantages of the prior art systems.

Most remotely controlled cameras are installed in locations such as ceilings, the tops and sides of buildings and other such locations having limited accessibility. Accordingly, it is desirable to provide a reliable system which is not susceptible to the wear and breakage problems present in the prior art.

SUMMARY OF THE INVENTION

According to one aspect, the present invention provides a belt drive tensioning apparatus in which a housing has a body wall and a first longitudinal axis. The body wall is configured to position a drive pulley aligned substantially coaxial with the first longitudinal axis. The housing includes a substantially circular tab provided at one end region in which the substantially circular tab has a second longitudinal axis which is parallel and eccentric to the first longitudinal axis.

According to another aspect, the present invention provides a belt drive tensioning system having an accessory pulley. A receptacle has a substantially circular opening and an extension. The extension is disposed partially around a periphery of an end region of the circular opening and projects partially over the opening. A drive pulley is substantially coplanar with the accessory pulley. A housing has a body wall, a first longitudinal axis and a substantially circular tab provided at an end region of the body wall. The substantially circular tab has a second longitudinal axis that is parallel and eccentric to the first longitudinal axis. A drive pulley is substantially coaxially aligned along the first longitudinal axis and is rotatably coupled to the housing. The housing is rotatably transitionable between the first position and a second position within the receptacle so that the substantially circular tab is engaged by the extension when the housing is transitioned to the second position where the drive pulley is at a second distance from the accessory pulley, the second distance being greater than the first distance.

According to still another aspect, the present invention provides a method of tensioning a drive belt for use in a remotely controlled camera system in which a drive pulley is provided adjacent to an accessory pulley. The drive pulley and the accessory pulley are encircled with a drive belt. The drive pulley is moved in an arcuate path away from the accessory pulley to tension the drive belt.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
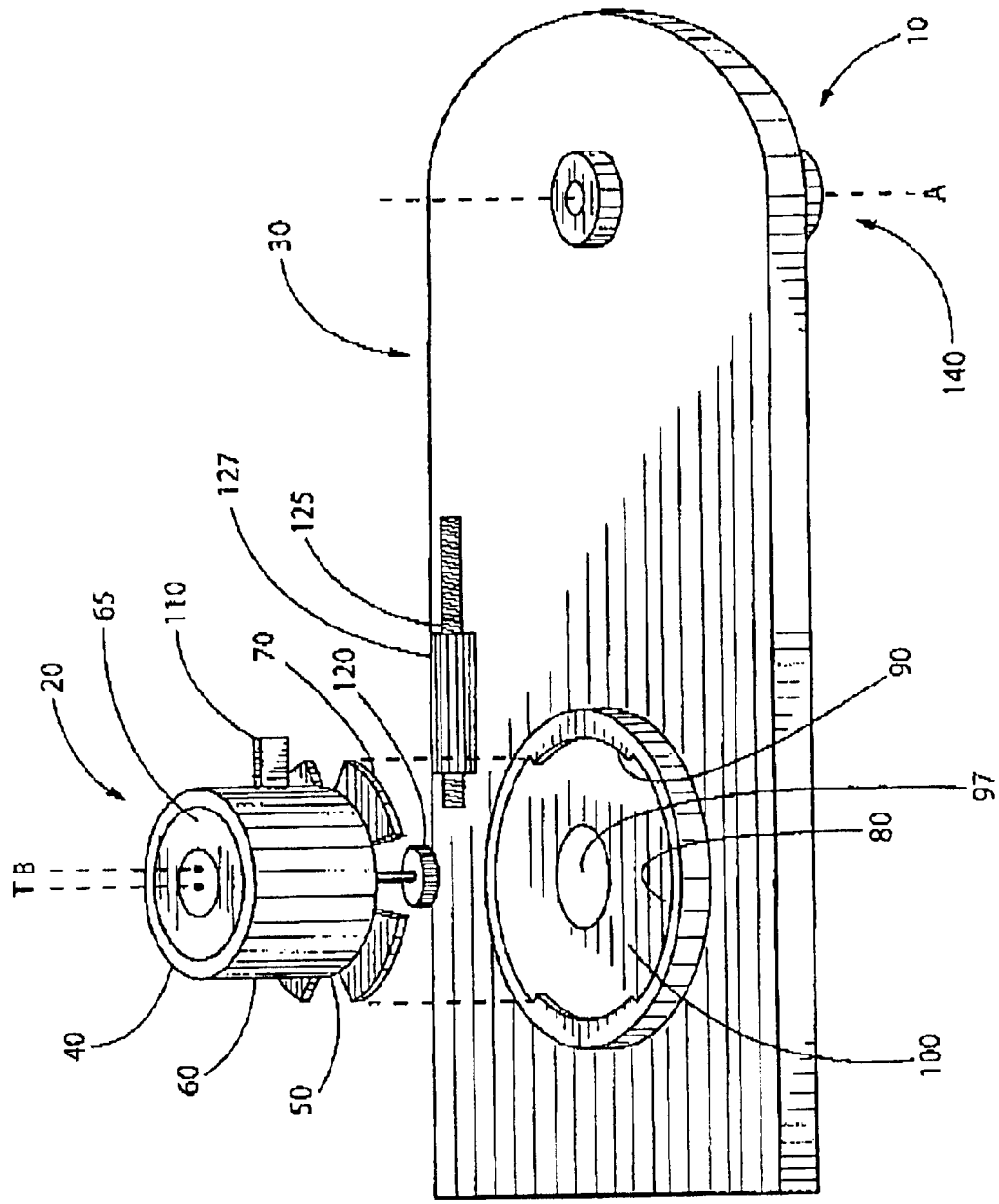
FIG. 1 is a perspective view of a belt tensioning system constructed in accordance with the principles of the present invention.

Initially, it is noted that the drive belt tensioning system described herein is particularly well suited for use in remotely controlled security cameras, such as devices which are operable to pan in the horizontal direction and tilt in the vertical direction, or vice versa. The system of the invention is used in both pan mechanisms and tilt mechanisms. The present invention advantageously reduces the number of steps for assembly of such devices. Further, the present invention provides an integrated motor fixation and drive belt tensioning system, which reduces both tooling costs and materials expenditures. The advantages of the present invention will be more fully understood with reference to the drawing Figures.

Referring now to the drawing Figures in which like reference designators refer to like elements, there is shown in FIG. 1 a perspective view of a system constructed in accordance with the principles of the present invention and designated generally as 10. The system 10 includes a motor housing 20 and a platform housing 30 configured to receive portions of the motor housing 20 therein. Exemplary construction materials for the motor housing 20 and the platform housing 30 include, metals, alloys, plastics, or combinations thereof. In an exemplary embodiment, the motor housing 20 is constructed from an alloy and the platform housing 30 is molded in plastic. It will readily be understood that construction techniques available in the prior art can facilitate various alternate materials configurations of the components of the invention.

The motor housing 20 has a first end area 40, second end area 50, and a body wall 60 constructed to form a substantially cylindrical structure. The motor housing 20 houses a drive motor 65. An exemplary drive motor 65 is a stepper motor. It is contemplated that other suitable drive motors can be employed as well.

Further provided, disposed on the second end area 50 of the motor housing 20 is a substantially circular tab 70 having a first bearing surface 75 and a second bearing surface 77. The platform housing 30 includes a receptacle 80 configured to rotatably receive the substantially circular tab 70 therein. Provided at an upper periphery of the receptacle 80 is at least one extension 90. Extension 90 extends over the receptacle 80 and has a third bearing surface 95. Both the substantially circular tab 70 and the extension 90 each have at least one clearance notch 79 and 99, respectively. The clearance notches 79 and 99 each correspond to portions of extension 90 and the substantially circular tab 70 respectively to allow insertion of the motor housing 20 into the receptacle 80. Clearance notch 79 has a midpoint that is located approximately 180 degrees around substantially circular tab 70 from the midpoint of clearance notch 99. Further provided is a drive port 97 which passes through the platform housing 30.

During assembly of the motor housing 20 and the platform housing 30, the tab 70 is maneuvered past the extension 90 to seat upon a fourth bearing surface 100 of the receptacle 80. After the tab 70 has been seated against the fourth bearing surface 100, the entirety of the motor housing 20 is rotated to thereby slidably engage the first bearing surface 75 against the third bearing surface 95 of the extension 90. As such, the substantially circular tab 70 is positioned under the extension 90 in a captive position. In this manner the system 10 provides for rotatable fixation of the motor housing 20 within the platform housing 30. Optionally further provided on the motor housing 20 is a locking tab 110 configured to be engaged by a locking fixture 125 which is optionally provided disposed upon the platform housing 30. An exemplary locking fixture is a set screw arrangement, as discussed in more detail herein.

In operation, once the motor housing 20 is rotatably engaged within the platform housing 30 the locking fixture 125 is operated to engage the locking tab 110 to thereby prevent backwards rotation of the motor housing 20 within the platform housing 30. It is contemplated that the platform housing 30 can either be molded or integrated with the structure of a remotely controlled camera drive mechanism or the platform housing can be configured to be separately constructed and thereinafter attached to the drive mechanism. The present invention provides for other such arrangements as well. The present invention also advantageously provides for a configuration which reduces the number of components and steps necessary to affect drive belt tensioning in the limited space available within a remotely controlled surveillance camera.

Another feature of the invention is further provided by the motor housing 20 having a longitudinal axis B and the tab 70 having a longitudinal axis T aligned parallel and eccentric to the longitudinal axis B of the motor housing 20 as shown in FIG. 1. As an example, motor housing is arranged such that the distance between longitudinal axis T and longitudinal axis B is approximately 1.8 millimeters (0.07 inches). Further provided is an accessory pulley 140 having a longitudinal axis A substantially aligned parallel to the longitudinal axis B of the motor housing. The accessory pulley 140 is positioned near the drive port 97 in the platform housing 30. It is contemplated that a drive pulley 120 can be mounted on a shaft aligned substantially coaxial with the longitudinal axis B of the motor housing 20. When the motor housing 20 is rotated within the platform housing 30, the longitudinal axis of the motor housing 20 and the drive pulley 120 are displaced in an arcuate path. By positioning the substantially circular tab 70 in such a manner as to displace the drive pulley 120 in a direction opposite the location of the accessory pulley 140, a system for tightening a drive belt is provided. The specific structure and function as described herein will be more clearly defined by referring to the Figures and description found herein.

Figure 2:
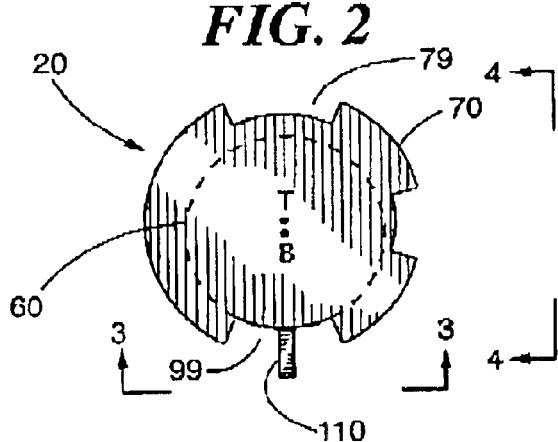
FIG. 2 is a first view of a motor housing of the system shown in FIG. 1.

FIG. 2 is a plane view of the second end area 50 of the motor housing 20 showing an exemplary shape of the substantially circular tab 70. Shown in phantom line is the location of the body wall 60. The drive pulley 120 is absent in FIG. 2 for the ease of illustration. FIG. 2 shows the longitudinal axis of the body wall 60 which runs through the center and is designated as longitudinal axis B. Further shown is the longitudinal axis T of the substantially circular tab 70 placed in the center of the circumference thereof. Axis T is offset and eccentric in a rotational sense to axis B. Further shown in FIG. 2 is optional locking tab 110 disposed about the periphery of the body wall 60. Further illustrated in FIG. 2 are clearance notches 79 provided in the substantially circular tab 70.

Figure 3:
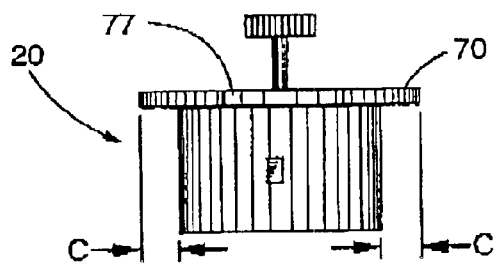
FIG. 3 is a plane side view of the motor housing depicted in FIG. 2.
Figure 4:
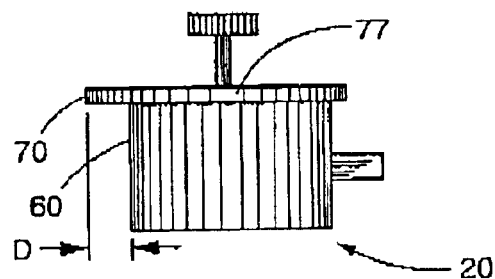
FIG. 4 is an alternate plane side view of the motor housing depicted in FIG. 2.

FIG. 3 is a side view of the motor housing 20 taken along section 3—3 in FIG. 2 which depicts the relative placement of the substantially circular tab 70 relative to the body wall 60. FIG. 3 shows a substantial equidistance of overhang on each side of substantially circular tab 70 designated as distance C. As an example, distance C can be in the range from approximately 3.1 cm to approximately 5.2 cm. One exemplary embodiment has a distance C of approximately 5.2 cm. In contrast, FIG. 4 is a view taken along section 4–4 in FIG. 2 which shows the relative offset of the substantially circular tab 70 to the body wall 60 designated as distance D. As an example, distance D can be in the range from approximately 1.5 cm to approximately 3.4 cm. One exemplary embodiment has a distance D of approximately 3.35 cm. Distance D represents the relative offset of the longitudinal axis of the tab 70 to the motor housing 20.

Figure 5:
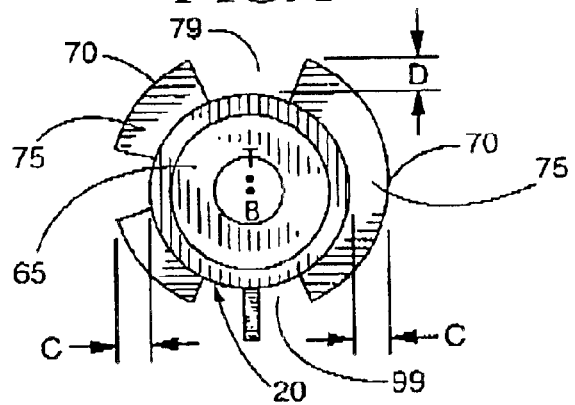
FIG. 5 is a top view of the motor housing depicted in FIG. 2 showing bearing surfaces.

FIG. 5 is a plane view of the first end area 40 of the motor housing 20 further showing the relative offset of the central longitudinal axis T of the substantially circular tab 70 to the centrally located longitudinal axis B of the motor housing 20. Also shown is the relationship of the distance C relative to the distance D and their correlation to the offset of axis T to axis B.

Figure 6:
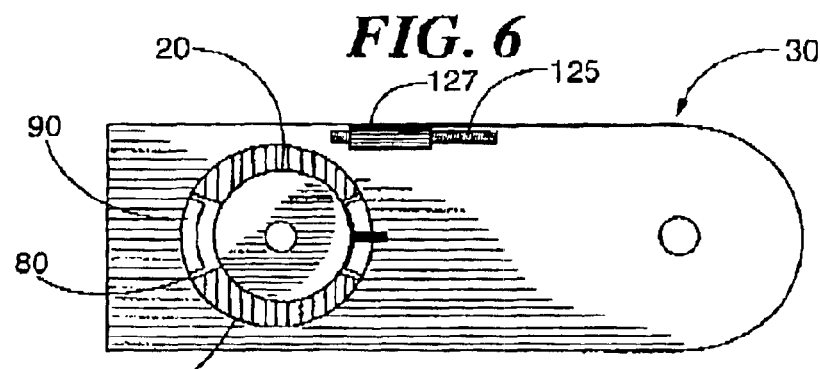
FIG. 6 is a plane top view of the housing depicted in FIG. 6 with the motor housing depicted in FIG. 2 installed therein in a first state.

FIG. 6 is a top view of the platform housing 30 shown with the motor housing 20 installed therein in a first position. It is apparent from FIG. 6 that the substantially circular tab 70 is aligned with the extension 90 in such a way to allow insertion of the motor housing 20 into the receptacle 80 of the platform housing 30.

Figure 7:
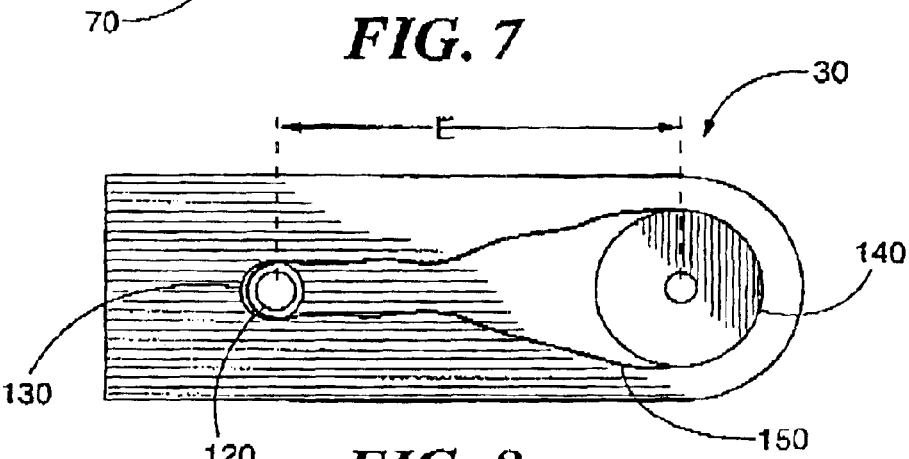
FIG. 7 is a plane bottom view of the housing depicted in FIG. 6 with the motor housing depicted in FIG. 2 installed therein in a first state.

FIG. 7 shows a plane bottom view of platform housing 30. Platform housing 30 has an opening 130 through which drive pulley 120 protrudes when the motor housing 20 (not shown) is installed in the receptacle 80 of the platform housing 30. The platform housing 30 is configured such that when the motor housing 20 is engaged therein, the drive pulley 120 is co-planar with the accessory pulley 140. Placed around the accessory pulley 140 and the drive pulley 120 is a drive belt 150. The term "drive belt" as used herein is contemplated to mean any type of material which can be used for transmitting rotational force from one pulley to another. For example, a drive belt can be a flexible belt made of rubber or plastic, a chain made of plastic or metal, or any other such drive mechanisms as are known in the art. FIG. 7 shows the drive belt in a slackened state due to a distance E between the longitudinal axis of the drive pulley 120 and the longitudinal axis of the accessory pulley 140. One exemplary embodiment has a distance E of approximately 45.1 cm. As such, the drive belt 150 is configured to be of a length which loosely fits around the respective peripheries of the drive pulley 120 and the accessory pulley 140 when the motor housing is installed in the initial position.

Figure 8:
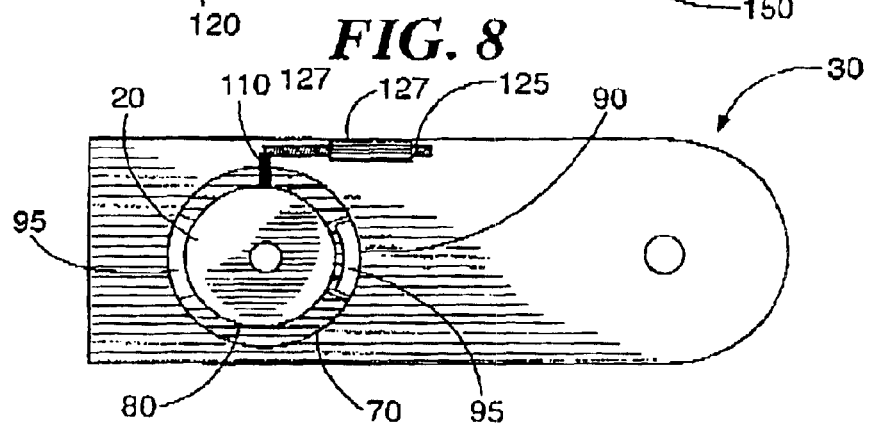
FIG. 8 is an alternate plane top view of the housing depicted in FIG. 6 with the motor housing depicted in FIG. 2 installed therein in a second state.

FIG. 8 shows a top view of the platform housing 30 with the motor housing 20 installed and rotated a position which tensions the drive belt. FIG. 8 shows the circular tab 70 located under the extension 90 when the motor housing 20 is rotated into the tensioned position. As such, the motor housing 20 is restricted from moving out of the receptacle 80. In this manner, the motor housing 20 is fixedly engaged into the platform housing 30. Further optional locking fixture 125 is shown engaged with optional locking tab 110 located on the outer periphery of the motor housing 20. An exemplary locking fixture 125 is comprised of a set screw which is driven into a fixed nut 127 mounted on the platform housing 30. When the set screw is rotated into the fixed nut 127, the screw extends against the locking tab 110. It is contemplated that other locking fixtures can be employed as well. For example, a retaining pin or clip can be used to engage the locking tab 110. The locking fixture 125 prevents the reverse rotation of the motor housing 20 within the receptacle 80.

Figure 9:
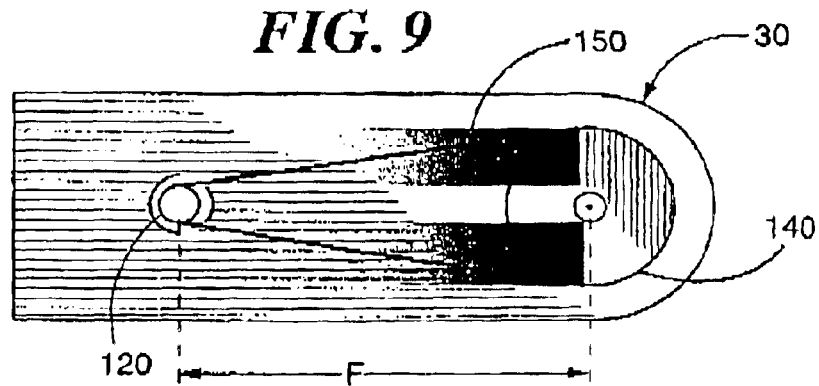
FIG. 9 is a bottom plane view of the housing depicted in FIG. 6 with the motor housing depicted in FIG. 2 installed therein in a second state.

FIG. 9 shows a bottom view of the platform housing 30 with the motor housing rotated into the belt tensioned position. When the motor housing 20 is in the belt tensioned position, the drive pulley 120 is moved through an arcuate path away from the accessory pulley 140. Distance F is the distance between the longitudinal axis of the drive pulley 120 and the longitudinal axis of the accessory pulley 140. Distance F is greater than distance E of FIG. 7. One exemplary embodiment has a distance F of approximately 48.7 cm. As such, the belt 150 is pulled between the drive pulley 120 and the accessory pulley 140 to a belt tensioned state. It is contemplated by the present invention that the motor housing 20 can be rotationally transitioned to infinite positions between the installation position or belt slackened position to the belt tensioned position to vary the tension applied to the drive belt 150. Further, that optional set screw 125 shown in FIG. 8 can be used to maintain and control rotational position of the motor housing 20 by applying varying pressure to locking tab 110.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A belt drive tensioning apparatus comprising: a housing, the housing having; a body wall; a first longitudinal axis, the body wall configured to position a drive pulley aligned substantially coaxial with the first longitudinal axis; a substantially circular tab provided at an end region, the substantially circular tab having a second longitudinal axis, the second longitudinal axis being parallel and eccentric to the first longitudinal axis; and a locking tab disposed on an outer periphery of the body wall substantially perpendicular to the first longitudinal axis.

2. A belt drive tensioning apparatus comprising: a housing, the housing having; a body wall; a first longitudinal axis, the body wall configured to position a drive pulley aligned substantially coaxial with the first longitudinal axis; and a substantially circular tab provided at an end region, the substantially circular tab having a second longitudinal axis, the second longitudinal axis being parallel and eccentric to the first longitudinal axis, wherein the substantially circular tab includes a clearance notch.

3. The belt drive tensioning apparatus of claim 2 wherein the substantially circular tab has a first clearance notch having a first midpoint and a second clearance notch having a second midpoint located approximately 180 degrees around the substantially circular tab from the midpoint of the first clearance notch.

4. A belt drive tensioning apparatus comprising: a housing, the housing having: a body wall; a first longitudinal axis, the body wall configured to position a drive pulley aligned substantially coaxial with the first longitudinal axis; and a substantially circular tab provided at an end region, the substantially circular tab having a second longitudinal axis, the second longitudinal axis being parallel and eccentric to the first longitudinal axis, wherein the housing is configured to engage a receptacle in a remotely controlled surveillance camera.

5. The belt drive tensioning apparatus of claim 4 wherein the body wall is tubular.

6. The belt drive tensioning apparatus of claim 4 wherein the body wall is substantially cylindrical.

7. The belt drive tensioning apparatus of claim 4, wherein a distance between the first longitudinal axis and the second longitudinal axis is approximately 1.8 millimeters.

8. The belt drive tensioning apparatus of claim 4, further comprising: an accessory pulley; the housing being rotatably transitionable between a first position and a second position when rotated around the second longitudinal axis so that when the housing is rotatably transitioned to the second position, the housing is at a further distance from the accessory pulley than when the housing is at the first position.

9. The belt drive tensioning apparatus of claim 4 further comprising a stepper motor disposed within the housing.

10. A belt drive tensioning system, comprising: an accessory pulley; a receptacle, the receptacle having a substantially circular opening and an extension, the extension being disposed partially around a periphery of an end of the circular opening and projecting partially over the opening; a drive pulley substantially coplanar with the accessory pulley; and a housing, the housing having: a body wall; a first longitudinal axis; and a substantially circular tab provided at an end region of the body wall, the substantially circular tab having a second longitudinal axis, the second longitudinal axis being parallel and eccentric to the first longitudinal axis; said drive pulley being substantially coaxially aligned along the first longitudinal axis and being rotatably coupled to the housing; the housing being configured to engage the receptacle in a first position where the drive pulley is at a first distance from the accessory pulley, the housing being rotatably transitionable between the first position and a second position within the receptacle so that the substantially circular tab is engaged by the extension when the housing is transitioned to the second position where the drive pulley is at a second distance from the accessory pulley, the second distance being greater than the first distance.

11. The belt drive tensioning system of claim 10, wherein the second longitudinal axis travels in an arcuate path when the housing is rotated from the first position to the second position.

12. The belt drive tensioning system of claim 10, further comprising: a locking tab disposed on an outer periphery of the body wall substantially perpendicular to the first longitudinal axis; and a locking fixture configured disposed adjacent the receptacle on the platform housing to be deployable to engage the locking tab.

13. The belt drive tensioning system of claim 10, wherein the substantially circular tab has a first clearance notch corresponding to the extension such that the extension passes through the first clearance notch when the housing is installed into the receptacle and the extension has a second clearance notch corresponding to the substantially circular tab such that the substantially circular tab passes through the second clearance notch when the housing is installed into the receptacle.

14. The belt drive tensioning system of claim 10, wherein a drive belt encircles the drive pulley and the accessory pulley and the drive belt is tensioned when the motor housing is transitioned to the second position.

15. The belt drive tensioning system of claim 10, wherein the receptacle is incorporated into a remotely controlled surveillance camera drive mechanism.

16. The belt drive tensioning system of claim 10, wherein the body wall is tubular.

17. The belt drive tensioning system of claim 10, wherein the body wall is substantially cylindrical.

18. The belt drive tensioning system of claim 10, further comprising a stepper motor mounted within the housing.

19. The belt drive tensioning system of claim 10, further comprising a camera coupled to the accessory pulley.

20. A method of tensioning a drive belt for use in a remotely controlled camera system, the method comprising: providing a drive pulley adjacent an accessory pulley, the accessory pulley being coupled to a camera; encircling the drive pulley and the accessory pulley with a drive belt; and moving the drive pulley in an arcuate path away from the accessory pulley to tension the drive belt, wherein the drive pulley is positioned on a motor within a motor housing which is eccentrically mounted to a platform which supports the motor housing and the accessory pulley.

21. The method of tensioning a drive belt of claim 20, wherein the motor housing is rotated to affect the arcuate path.

* * * * *